United States Patent [19]
Valenta

[11] 3,876,705
[45] Apr. 8, 1975

[54] STEROID TOTAL SYNTHESIS AND INTERMEDIATES

[75] Inventor: Zdenek Valenta, Fredericton, New Brunswick, Canada

[73] Assignee: The University of New Brunswick, Fredericton, New Brunswick, Canada

[22] Filed: June 12, 1972

[21] Appl. No.: 261,853

[52] U.S. Cl. .......... 260/590; 260/340.5; 260/340.9; 260/397.3; 260/397.4; 260/471 R; 260/476 C; 260/488 B; 260/488 CD; 260/586 H
[51] Int. Cl. ...................... C07d 13/04; C07c 49/44
[58] Field of Search ..................... 260/340.9, 586 H

[56] References Cited
UNITED STATES PATENTS
3,234,244    2/1966    Cross ............................. 260/397.45

OTHER PUBLICATIONS
Baran, "Chemical Abstracts," Vol. 56, (1962), Col. 1498e to 1499a.

Morisawa, "Chemical Abstracts," Vol. 61, (1964), Col. 16116e.

*Primary Examiner*—Donald G. Daus
*Assistant Examiner*—James H. Turnipseed
*Attorney, Agent, or Firm*—Samuel L. Welt; Jon S. Saxe; George M. Gould

[57] ABSTRACT

A new steroidal synthesis process is described wherein the steroidal nucleus is provided by a Diels-Alder reaction between a 2,6-lower alkylbenzoquinone and a suitably substituted 1-vinyl-naphthalene compound. Depending on the nature of the naphthalene compound it is possible to readily prepare estrones, progesterones, androstanes and cortisones having the natural configuration or if desired having the retro configuration.

5 Claims, No Drawings

STEROID TOTAL SYNTHESIS AND INTERMEDIATES

DESCRIPTION OF THE INVENTION

The present invention relates to an improved process for the total synthesis of pharmaceutically valuable steroids wherein the steroidal nucleus is obtained by Diels-Alder reaction between a 2,6-lower alkylbenzoquinone of the formula

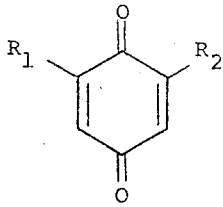

wherein $R_1$ and $R_2$ both independently are $C_1-C_4$ lower alkyl and 1-vinyl naphthalene compound selected from compounds of the formulae

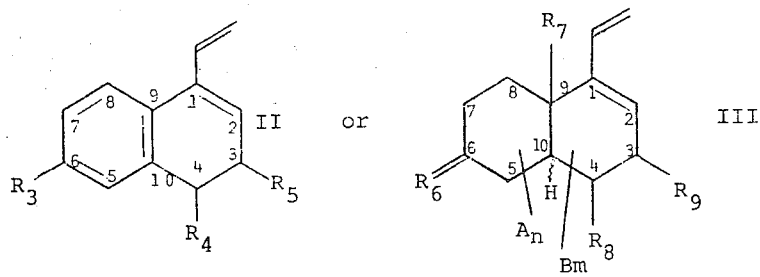

wherein $R_3$ is hydrogen, $C_1-C_7$ lower alkoxy, $C_7-C_{12}$ aryl lower alkoxy or $C_1-C_{12}$ acyloxy; $R_4$, $R_5$, $R_8$ and $R_9$ are independently selected from the group consisting of hydrogen or $C_1-C_7$ lower alkyl; $R_6$ is oxo, $C_1-C_5$ lower alkylenedioxy, $C_6-C_{12}$ arylenedioxy, H,H or H,$R_{10}$, where $R_{10}$ is $C_1-C_7$ lower alkoxy, $C_7-C_{12}$ aryl lower alkoxy or $C_1-C_{12}$ acyloxy; $R_7$ is $C_1-C_4$ lower alkyl or $C_2-C_4$ lower alkylene, A is an additional carbon-carbon bond between positions 5 and 10; B is an additional carbon-carbon bond between positions 4 and 10; $m$ and $n$ are 0 or 1 with the proviso that if either is 1 then the other is 0
so as to produce a compound selected from the formulae:

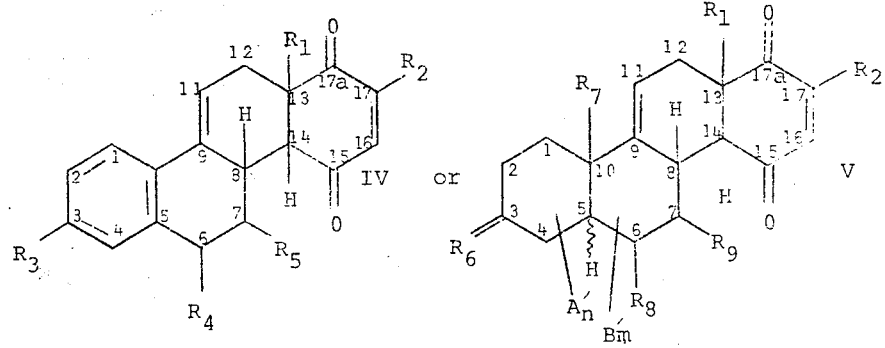

wherein $R_1$, $R_2$, $R_3$, $R_4$, $R_5$, $R_6$, $R_7$, $R_8$, $R_9$, $m$ and $n$ are as above and A' is an additional carbon-carbon bond between positions 4 and 5; and B' is an additional carbon-carbon bond between position 5 and 6.

It is evident from the foregoing that aromatic A-ring-D-homosteroidal intermediates of the formula IV are obtained when the dihydronaphthalene compounds of formula II are used in the aforesaid Diels-Alder reaction while the saturated A-ring-D-homo steroidal intermediates of the formula V are obtained when the hexa- or octa-hydronaphthalene compounds of formula III are used. Furthermore, the hydrogen atom at the position 10 may be cis or trans to $R_7$ as shown by the wavy line in formulae III and V.

As used herein the term "lower alkyl" is meant to include straight or branched chain saturated hydrocarbon radicals such as methyl, ethyl, i-propyl, n-butyl, and the like. The term "lower alkoxy" is meant to include a lower alkyl oxy radical having its valence bond from the ethereal oxygen atom. The term "aryl" is meant to include monocyclic aromatic hydrocarbons which may be substituted on the ring with one or two lower alkyl groups. Phenyl represents a preferred aryl group. "Aryl loweralkoxy" is meant to include groups such as phenyl lower alkoxy, preferably benzyloxy. Suitable acyloxy groups are derived from alkanoic or benzoic (which may be further substituted by lower alkyl, nitro or halo) acids commonly used to esterify steroidal hydroxy moieties including, for example, acetoxy, propionoxy, benzoyloxy and the like. Examples of arylalkyl groups useful herein include phenyl lower alkyl groups such as benzyl and phenethyl. Suitable "lower alkylenedioxy" and "arylenedioxy" groups include those commonly used as a protective ketal group in steroid chemistry such as for example ethylenedioxy, 1,2-propylenedioxy, 2,3-butylenedioxy, phenylenedioxy, 4,5-dimethylphenylenedioxy, 1,2-naphthalenedioxy, 2,3-naphthalenedioxy and the like. The term "lower alkylene" is meant to include straight or branched chain hydrocarbon radicals containing one carbon-carbon double bond such as, for example, ethylenyl, propylenyl, butylenyl and the like. In all instances the carbon chain length for each of the designated radicals is shown by the C-C designation, so for example $C_1-C_4$ is meant to indicate a radical group having from 1 to 4 carbon atoms.

The Diels-alder reaction between compounds of formula I and compounds of formula II or formula III can be conducted at a temperature in the range of from about −70° to 80°C., most preferably at about room temperature. An acid catalyst is employed in the reaction. Suitable acid catalysts include the mineral acids such as sulfuric acid, hydrochloric acid, phosphoric acid, etc; p-toluenesulfonic acid and the Lewis acids such as aluminum chloride, titanium tetrachloride, borontrifluoride (preferably as its etherate) and the like. Aluminum chloride and boron trifluoride represent acid catalysts of preference for this reaction.

The reaction will generally be conducted in the presence of a suitable organic solvent such as ethers, i.e., ethyl ether, dioxane, tetrahydrofuran and the like or aromatic hydrocarbons, i.e., benzene and toluene, or chlorinated hydrocarbons, i.e., methylene chloride. Ethyl ether and toluene are the solvents of preference.

It should be noted that the D-homo steroid products of the Diels-Alder reaction have the undesired 14-6$_2$ configuration. It is necessary to subject the compounds of formula IV or formula V to an epimerization procedure to produce the "natural" 14α- configuration. This epimerization can be readily carried out using an alkali bicarbonate, i.e., sodium bicarbonate in a refluxing lower alkanol, i.e., methanol.

The total synthesis process of the present invention with regard to the prepartion of A-ring aromatic compounds is summarized below in Reaction Scheme A.

Reaction Scheme A

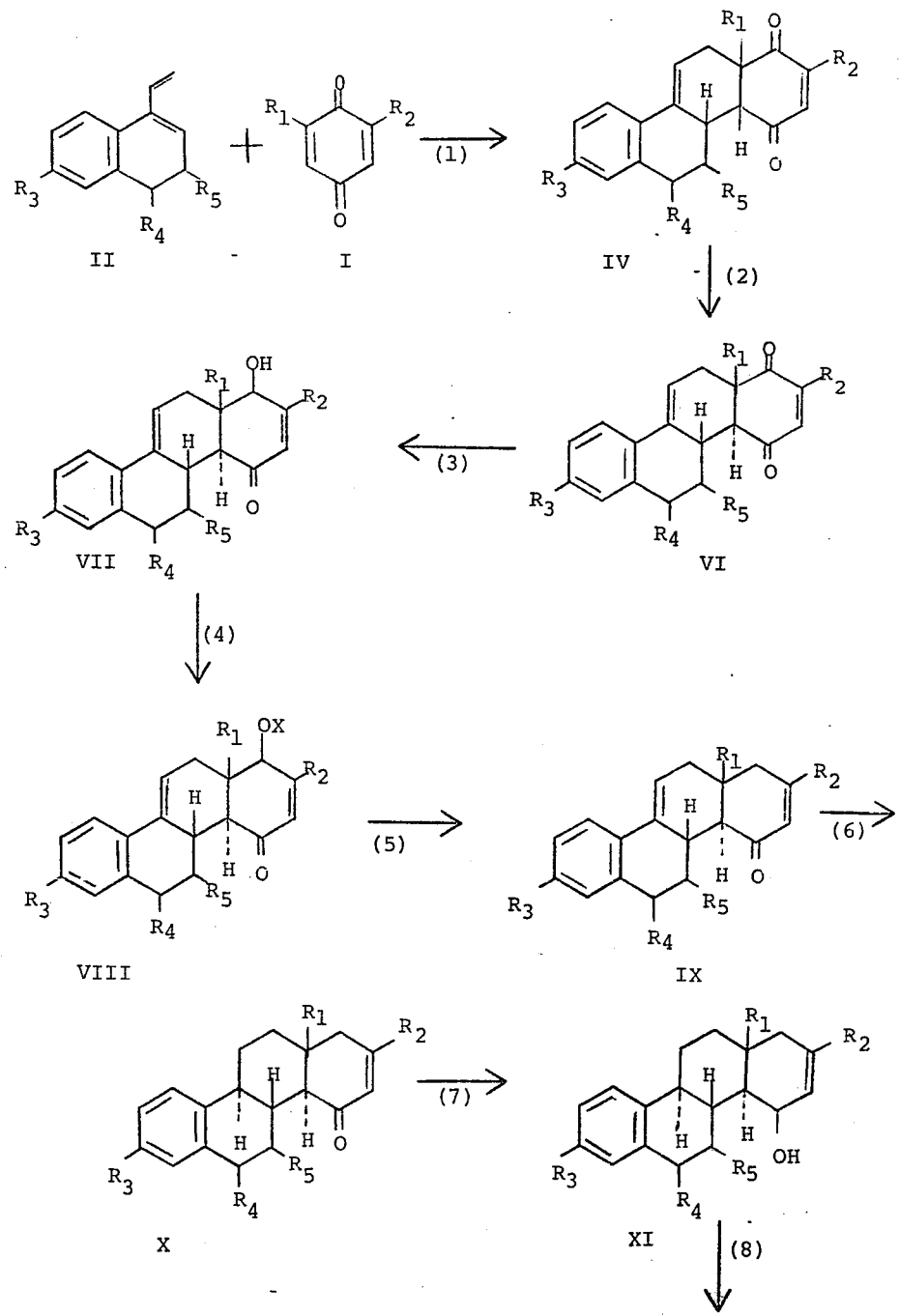

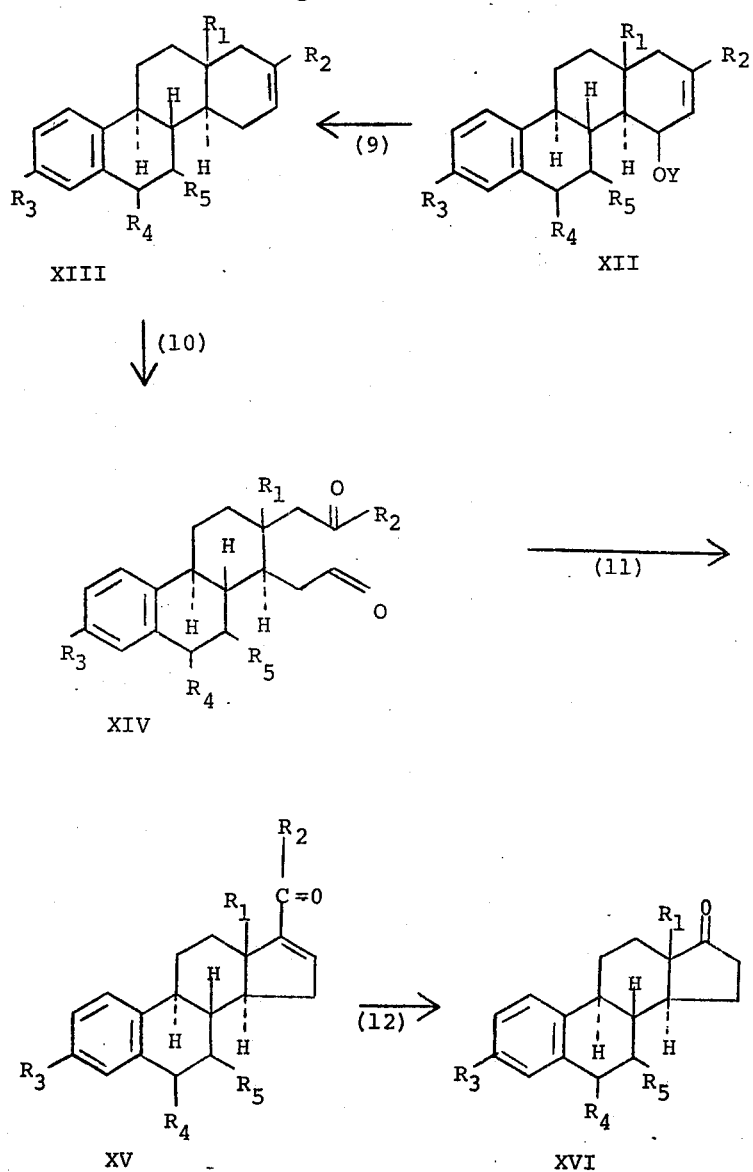

wherein $R_1R_2$, $R_3$, $R_4$ and $R_5$ are as above; X is a sulfonyl selected from the group consisting of $C_1$-$C_7$ lower alkyl sulfonyl, $C_6$-$C_{12}$ arylsulfonyl and terpenyl sulfonyl; and Y is $C_1$-$C_{12}$ acyl, $C_1$-$C_7$ lower alkyl and $C_7$-$C_{12}$ aryl alkyl.

Preferred X substituent groups include methyl sulfonyl, toluyl sulfonyl and mono- or bicylic terpenyl sulfonyl, most preferably d-camphor sulfonyl. The optically active terpene sulfonyl groups such as d-camphor sulfonyl can be used as resolving groups for resolution of the molecule on which they are substituted. A preferred Y group is acetyl.

The specific reaction parameters useful in the reaction steps contained in Reaction Scheme A are summarized below in Table I.

A preferred embodiment of the aspect of the present invention described in Reaction Scheme A is obtained when $R_1$ and $R_2$ are the same group and are either

TABLE I

| Reaction Step | Conditions | | Solvents | | Catalysts-Reagents | |
|---|---|---|---|---|---|---|
| | Useful | Preferred | Useful | Preferred | Useful | Preferred |
| (1) | Temp. = −70° to 80°C. | room temp. | Ethers, aromatic hydrocarbons, chlorinated hydrocarbons | Ethyl ether, toluene | Acids | Lewis acids, $BF_3$, $TiCl_4$, $AlCl_3$ |
| (2) | Temp. = −20° to 100°C. | reflux temp. | lower alkanols | Methanol | Bases, e.g. alkali bicarbonate | $NaHCO_3$ |

TABLE I—Continued

| Reaction Step | Conditions Useful | Conditions Preferred | Solvents Useful | Solvents Preferred | Catalysts-Reagents Useful | Catalysts-Reagents Preferred |
|---|---|---|---|---|---|---|
| (3) | Temp. = 0° to 65°C. | room temp. | ethers, lower alkanols | tetrahydro-furan | complex metal hydrides | lithium aluminum-tritert.butoxyhydride |
| (4) | Temp. = −20° to 40°C. | 0°C. | organic bases | pyridine | sulfonyl halides | methane sulfonyl chloride |
| (5) | Temp. = −50° to 130°C. | reflux temp. | lower alkanols, aromatic hydrocarbons, organic acids, anhydrides | benzene-methanol (1:1) | | zinc dust |
| (6) | 20–50°C. 1–20 atm. | room temp. 1 atm. pressure | lower organic acids, lower alkanols, esters | glacial acetic acid | Pt, Pd, Ru, Rh catalysts | 10% Pd/CaCO$_3$ |
| (7) | Temp. = −20° to 60°C. | room temp. | ethers, lower alkanols | ethyl ether | complex metal hydrides | sodium bis-(2-methoxy-ethoxy) aluminum hydride |
| (8) | Temp. = −20° to 40°C. | room temp. | ethers; aromatic hydrocarbons; chlorinated hydrocarbons; organic bases | pyridine | anhydrides; acid chlorides; organic acids with carbodi-imides; alkyl halides; aryl alkyl halides | acetic anhydride |
| (9) | −50° to −25°C. | reflux temp. | lower alkylamines or ammonia with ethers | tetrahydro-furan and liquid ammonia | alkali metals | lithium |
| 10) a) | Temp. −60° to 50°C. | room temp. | ethers; organic bases; esters; lower alkanols | pyridine | OsO$_4$—NaClO$_3$; O$_3$; OsO$_4$—NaIO$_4$; KMnO$_4$ | osmium tetroxide |
| b) | Temp. −40° to 50°C. | 0°C. | ethers; lower alkanols; acetic acid; aromatic hydrocarbons | tetrahydro-furan | sodium periodate, lead tetra-acetate | lead tetraacetate |
| 11) | Temp. 0° to 120°C. | 75°C. | Water; ethers; lower alkanols; aromatic hydrocarbons; acetic acid | Tetrahydro-furan - water | Mineral and organic acids; inorganic and organic bases | Hydrochloric acid |
| 12) a) | Temp. 20° to 120°C. | reflux temp. | alkanols, organic bases | ethyl alcohol-pyridine | — | hydroxylamine hydrochloride |
| b) | Temp. −20° to 50°C. | 0°C. | organic bases, aromatic hydrocarbons | pyridine | sulfonyl halides | methane sulfonyl chloride |
| c) | Temp. 0° to 120°C. | reflux temp. | alkanols, ethers, water | methanol-water | mineral acids, bases | potassium hydroxide | methyl or ethyl; $R_3$ is $C_1$–$C_7$ lower alkoxy, most preferably methoxy; $R_4$ and $R_5$ are each hydrogen; X is methane sulfonyl; and Y is acetyl.

The total synthesis process of the present invention with regard to the prepartion of A-ring saturated steroids is summarized below in Reaction Scheme B.

Reaction Scheme B

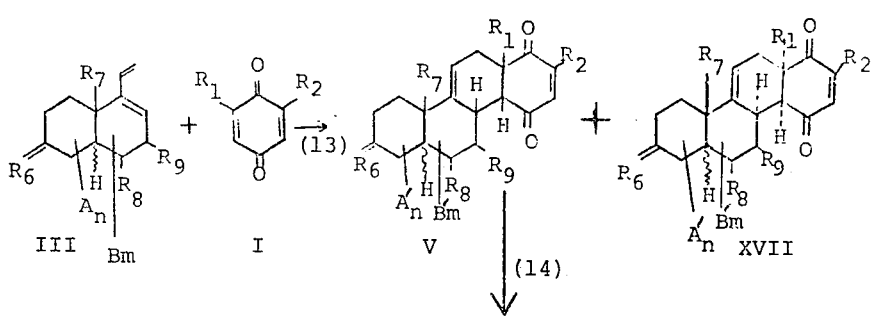

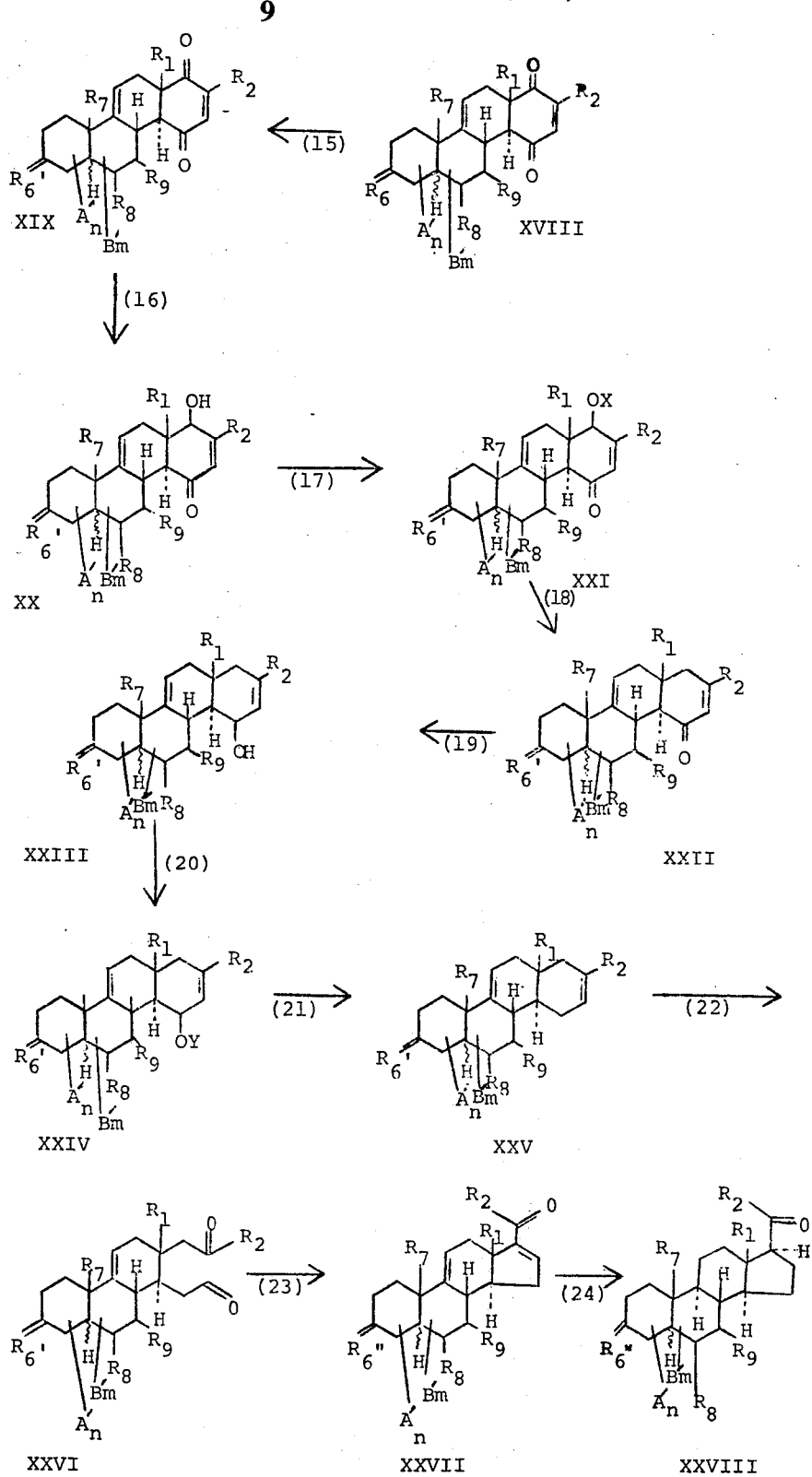

wherein $R_1$, $R_2$, $R_6$, $R_7$, $R_8$, $R_9$, A, B, A', B', m, n, X and Y are as above; $R_6'$ is $C_1$–$C_5$ lower alkylenedioxy, $C_6$–$C_{12}$ arylenedioxy, H,H or H,$R_{10}$ where $R_{10}$ is as above; and $R_6''$ is oxo, H,H or H,$R_{10}$ where $R_{10}$ is as above.

A preferred embodiment of the aspect of the present invention described in Reaction Scheme B is obtained when $R_1$ and $R_2$ are the same group and are either methyl or ethyl; $R_6$ is oxo; $R_6'$ is $C_1$–$C_5$ lower alkylenedioxy, most preferably ethylenedioxy; $R_6''$ is oxo; $R_7$ is $C_1$–$C_4$ lower alkyl, most preferably methyl; $R_8$ and $R_9$ are each hydrogen; and m and n are both 0, that is there is no unsaturation in either the A or B rings. Additionally, the hydrogen atom at position 10 is preferably trans to the $R_7$ substituent group.

The specific reaction parameters useful in the reaction steps contained in Reaction Scheme B are summarized below in Table II.

aforesaid reaction sequence then steroid products having the "retro" configuration, i.e., the substituent group $R_7$ at $C_{10}$ is alpha, are produced.

It is within the scope of the present invention to prepare either racemic or optically active steroidal final products by utilizing appropriate starting materials or

TABLE II

| Reaction Step | Conditions Useful | Preferred | Solvents Useful | Preferred | Catalysts-Reagents Useful | Preferred |
|---|---|---|---|---|---|---|
| (13) | Temp. −70° to 80°C. | −10°C. | Aromatic hydrocarbons, ethers, chlorinated hydrocarbons | Toluene | Acids | Lewis acids BF$_3$, TiCl$_4$, AlCl$_3$ |
| (14) | Temp. = −20° to 100°C. | reflux temp. | lower alkanol | methanol | bases, e.g., alkali bicarbonate | NaHCO$_3$ |
| (15) | Temp. = 0° to 100°C. | reflux temp. | aromatic hydrocarbons; alkanols | benzene | diols; alkanols; strong acids | ethylene glycol; p-toluenesulfonic acid |
| (16) | Temp. = 0° to 65°C. | room temp. | ethers, lower alkanols | tetrahydrofuran | complex metal hydrides | lithium aluminum tritert. butoxyhydride |
| (17) | Temp. = −20° to 40°C. | room temp. | organic bases | pyridine | sulfonyl halides | mesyl chlorides |
| (18) | Temp. = 50° to 130°C. | reflux temp. | lower alkanols, aromatic hydrocarbons, organic acids, anhydrides | benzene-methanol (1:1) |  | zinc dust |
| (19) | Temp. = −20° to 60°C. | room temp. | ethers, lower alkanols | ethyl ether | complex metal hydrides | sodium bis(2-methoxyethoxy) aluminum hydride |
| (20) | Temp. = −20° to 40°C. | room temp. | ethers, aromatic hydrocarbons, chlorinated hydrocarbons, organic bases | Pyridine | anhydrides, acid chlorides with carbodiimides, alkyl halides, arylalkyl halides | acetic anhydride |
| (21) | Temp. = −50° to 100°C. | reflux temp. | lower alkyl amines or ammonia with ethers | tetrahydrofuran and liquid ammonia | alkali metals | lithium |
| (22) a) | Temp. −60° to 50°C. | room temp. | ethers, organic bases, esters, lower alkanols | pyridine | OsO$_4$—NaClO$_3$, O$_3$, OsO$_4$—NaIO$_4$, KMnO$_4$ | osmium tetroxide |
| b) | Temp. = −40° to 50°C. | 0°C. | ethers, lower alkanols, acetic acid, aromatic hydrocarbons | tetrahydrofuran | sodium periodate, lead tetraacetate | lead tetraacetate |
| (23) | Temp. = 0° to 120°C. | reflux temp. | water, ethers, lower alkanols, aromatic hydrocarbons, acetic acid | tetrahydro- | mineral and organic acids, inorganic and organic bases | hydrochloric acid |
| (24) | Temp. = 0° to 100°C. 1–20 atm. | room temp. 1 atm. | alkanols, esters, lower alkanoic acids | ethyl acetate - acetic acid | Pt, Pd, Ru, Rh catalysts | palladium on charcoal |

The steroids produced as the final products of Reaction Schemes A and B are either compounds which possess valuable pharmaceutical properties or else are known intermediates in the preparation of pharmaceutically active steroids.

In reaction step (13) of Reaction Scheme B two products are recoverable from the Diels-Alder reaction. The first of these is the compound of formula V which has the "normal" configuration at $C_{10}$, i.e., the substituent group $R_7$ is beta. This compound produces "normal" steroids when it is used as starting material in reaction steps (14) → (23). On the other hand, when the compound of formula XVII is isolated from reaction step (13) and is used as starting material in the resolving intermediates in a manner well known in the art.

The process and novel intermediates of the present invention provide an improved route to pharmaceutically valuable steroids by total synthesis from readily available starting materials. Particular advantage of the overall synthesis resides in the fact that the 9 (11) double bond is automatically generated as is the 17-acetyl side chain.

Where starting materials of formulae II or III are not specifically known, they may be readily prepared in analogy to the preparation of 9,10-trans-9β-methyl-1-vinyl-3,4,5,6,7,8,9,10-octahydronaphthalene-6-one shown below in Reaction Scheme C.

Reaction Scheme C

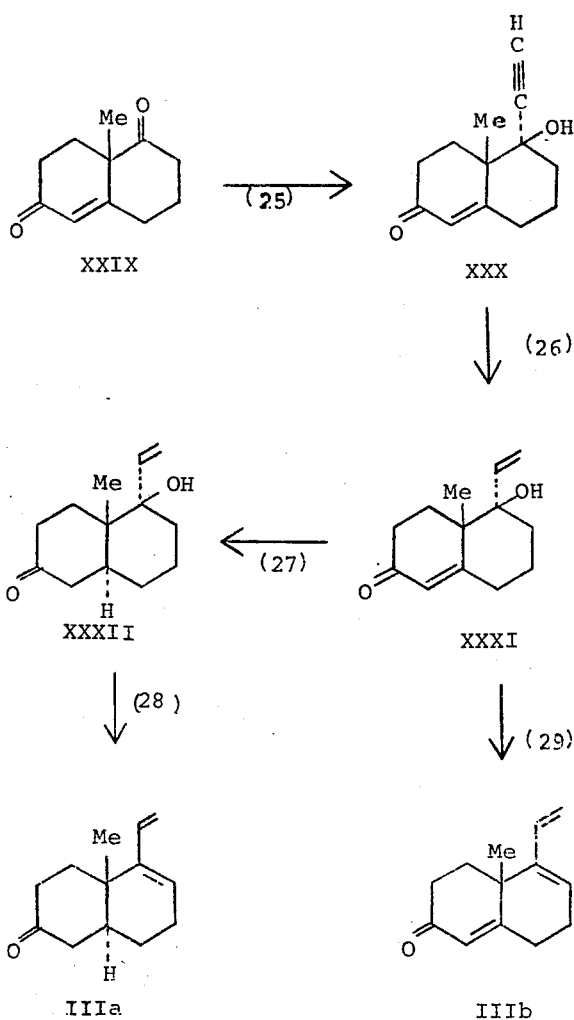

In process step (25) the bicylic enedione XXIX is treated with acetylene in the presence of lithium in liquid ammonia at −70°C. The resulting ethynyl alcohol XXX is then selectively hydrogenated using 5 percent palladium on barium sulfate in dry pyridine in step (26) to yield the vinyl alcohol XXXI. The internal double bond can be reduced in step (27) by treatment with lithium in liquid ammonia at −70°C. to yield the perhydronaphthalene compound XXXII. Dehydration in step (28) is accomplished by treatment with freshly fused potassium bisulfate and pyrogallol at 145°C. at reduced pressure to yield the compound of formula IIIa ($R_6$ = oxo, $R_7$ = methyl, $R_8$ and $R_9$ = hydrogen, $m$ and $n$ = 0).

Should it be desired to utilize starting materials of formula III wherein $n$ is 1 then the compound of formula XXXI is dehydrated directly to a compound of formula IIIb in process step (29) using the same reagents and conditions as were employed in process step (28) above.

The process of the present invention is further described in the Examples which follow. In these Examples all temperatures are in degrees Centigrade.

EXAMPLE 1

To a solution of 2,6-dimethylbenzoquinone (1.68 g., 0.0124 M) in 20 ml. of absolute ether was added 2.32 g. (0.0165 M) of boron trifluoride etherate dissolved in 5 ml. of absolute ether. The solution was allowed to stand at room temperature for 5 minutes and then a solution of 6-methoxy-1-vinyl-3,4-dihydronaphthalene (2.38 g., 0.0127 M) dissolved in 5 ml. of ether was added. After several minutes light tan crystals began to precipitate from the dark solution. After 1 hour the mixture was filtered and the crystals washed with ether. The crystals were dissolved in a minimum quantity of hot ethyl acetate and allowed to crystallize. In this manner 2.380 g. of 14β-3-methoxy-17-methyl-D-homo-estra-1,3,5,(10),9(11), 16-pentaen-15,17a-dione was obtained. Concentration of the mother liquors yielded a further 0.340 g. Total yield of dione product m.p. 194°–196° was 2.720 g. (69 percent).

EXAMPLE 2

A 200 ml. round bottom flask was charged with 1.610 g. (5.0 mM) of 14β-3-methoxy-17-methyl-D-homo-estra-1,3,5(10), 9(11), 16-pentaen-15,17a-dione, 322 mg. of sodium bicarbonate and 100 ml. of absolute methanol. The mixture was stirred at reflux until all of crystalline starting material had dissolved which took about 0.5 hours. Some of the methanol was removed at reduced pressure and 50 ml. of water was added and the light yellow precipitate which formed was filtered, washed with water and then cold ether, and dried in vacuo to give 1.521 g. (94 percent) of 13,-14-trans-3-methoxy-17-methyl-D-homo-estra-1,3,5(10), 9(11), 16-pentaen-15,17a-dione, m.p. 146°–148°.

EXAMPLE 3

A solution of 3-methoxy-17-methyl-D-homo-estra-1,3,5(10), 9(11), 16-pentaen-15,17a-dione (1.520 g., 4.72 mM) and lithium aluminum tri-tert-butoxyhydride (2.0 g., 7.88 mM) in 50 ml. of dry tetrahydrofuran was stirred at room temperature for 0.25 hour. The solution was diluted with water and extracted with chloroform and dried over magnesium sulfate. The solvent was removed in vacuo to give a white solid which was filtered and washed with ether to give 1.433 g. (94 percent) of 17a-hydroxy-3-methoxy-17-methyl-D- homo-estra-1,3,5(10), 9(11), 16-pentaen-15-one, m.p. 211°–213°.

EXAMPLE 4

A solution of 17a-hydroxy-3-methoxy-17-methyl-D-homo-estra-1,3,5,(10),9(11), 16-pentaen-15-one (1.433 g., 4.55 mM) and mesyl chloride (1.14 g., 10.0 mM and 20 ml. of dry pyridine was kept at 0° for 16 hours. The pyridine was diluted with water and extracted with chloroform. The chloroform extracts were combined, washed with 5 percent HCl, brine, and dried over magnesium sulfate. Removal of the solvent in vacuo and crystallization of the crude product from ether-hexane gave 1.420 g. (78 percent) of 3-methoxy-17a-methylsulfonyloxy-17-methyl-D-homo-estra-1,3,5,(10), 9(11), 16-pentaen-15-one.

EXAMPLE 5

A solution of 3-methoxy-17a-methylsulfonyloxy-17-methyl-D-homo-estra-1,3,5(10), 9(11), 16-pentaen-15-one (1.420 g., 3.53 mM) was refluxed in 100 ml. of benzene-methanol (1:1) for 12 hours in the presence of freshly activated zinc dust. Fresh portions of zinc dust were added every few hours so that a total of about 6.0 g. was used. The mixture was filtered and the solid material washed with benzene. The filtrate was partitioned between benzene and water and the organic layer separated, dried over magnesium sulfate and the solvent removed in vacuo to give 1.176 g. (100 percent) of white crystalline material that showed two spots on thin-layer chromatography; the N.M.R. and I.R. spectra indicated this material was mainly β,γ-isomer The mixture was dissolved in 100 ml. of hot methanol and 0.5 g. of sodium carbonate in 5 ml. of water was added. The solution was refluxed for 0.5 hour and extracted with benzene. Drying over magnesium sulfate and evaporation in vacuo gave 1.0 g. (92 percent) of 3-methoxy-17-methyl-D-homo-estra-1,3,5(10), 9(11), 16-pentaen-15-one. Recrystallization from benzene-hexane gave 900 mg. (83 percent) of pure product, m.p. 174°–175.5°.

EXAMPLE 6 a solution of 3-methoxy-17-methyl-D-homo-estra-1,3,5(10), 9(11), 16-pentaen-15-one (930 mg., 3.0 mM) in 20 ml. of glacial acetic acid containing 100 mg. of 10 percent Pd/CaCO₃ was hydrogenated at 1 atm. until 1 mole of hydrogen had been taken up. The catalyst was filtered and washed with benzene. The acetic acid was neutralized with aqueous sodium bicarbonate and extracted with benzene. Drying over magnesium sulfate and evaporation of the solvent in vacuo gave crude 3-methoxy-17-methyl-D-homo-estra-1,3,5(10), 16-tetraen-15-one as a white solid. Crystallization from benzene-hexane gave 785 mg. (84 percent) of product, m.p. 142°–144°.

EXAMPLE 7

To a solution of 3-methoxy-17-methyl-D-homo-estra-1,3,5(10), 16-tetraen-15-one (752 mg., 2.42 mM) in 20 ml. of dry ether at room temperature was added dropwise 0.84 ml. (6.0 mM) of sodium bis (2-methoxyethoxy) aluminum hydride as a 70 percent benzene solution. The mildly exothermic reaction was complete in about 10 minutes and 2.5 percent aqueous potassium hydroxide was added to destroy the excess hydride and the product was extracted with ether. The ether extracts were combined, washed with brine and dried over magnesium sulfate. Evaporation of the solvent in vacuo (20°) gave 755 mg. (100 percent) of oily 3-methoxy-17-methyl-D-homo-estra-1,3,5(10), 16-tetraen-15-ol.

EXAMPLE 8

The crude 3-methoxy-17-methyl-D-homo-estra-1,3,5(10), 16-tetraen-15-ol (755 mg., 2.42 mM) was dissolved in 15 ml. of dry pyridine and 15 ml. of freshly distilled acetic anhydride. The solution was stirred at room temperature for 72 hours, diluted with ether and the acetic anhydride neutralized with aqueous sodium bicarbonate. The organic phase was drawn off and the aqueous phase extracted thoroughly with ether. The combined ether extracts were washed with 5 percent HCl, brine, and dried over anhydrous magnesium sulfate. The solvent was removed in vacuo (20°) to give a quantitative yield of crude 15-acetoxy-3-methoxy-17-methyl-D-homo-estra-1,3,5(10), 16-tetraene as an oil. This material is sensitive to acid and heat giving a mixture of dienes.

EXAMPLE 9 the crude allylic acetate from Example 8 was dissolved in 50 ml. of dry T.H.F. and added to 200 ml. of liquid ammonia. The ammonia-tetrahydrofuran solution was allowed to reflux and 100 mg. (14.5 mM) of lithium metal was added. The solution turned a deep blue and this color persisted throughout the course of the reaction. After 0.5 hour small portions of solid ammonium chloride were added until the color was discharged. The ammonia was allowed to evaporate and the residue extracted with ether, washed with 5 percent HCl, brine, and dried over magnesium sulfate. Removal of the solvent at reduced pressure and crystallization of the crude product from ether-methanol gave 557 mg. (78 percent) of 3-methoxy-17-methyl-D-homo-estra-1,3,5(10), 16-tetraene, m.p. 96°–97°.

EXAMPLE 10

A solution of 3-methoxy-17-methyl-D-homo-estra-1,3,5(10), 16-tetraene (500 mg., 1.69 mM) in 17 ml. of dry pyridine containing osmium tetroxide (476 mg., 1.87 mM) was stirred at room temperature for 2 hours. A solution of sodium bisulfite (1.02 g., 9.8 mM) in 10 ml. of water was added to the dark brown pyridine solution of the osmate ester and the solution stirred at 20° for 0.5 hour. The solution was poured into brine and extracted with chloroform. The combined chloroform extracts were washed with 5 percent HCl, dried over magnesium sulfate and evaporated in vacuo to give the crude 16, 17 diol which showed two spots on t.l.c.

The crude diol was dissolved in 15 ml. of dry T.H.F. and cooled to 0°. Lead tetraacetate (914 mg., 2.06 mM) was added and the mixture stirred for 5 minutes. The product was extracted with chloroform, washed with saturated NaHCO₃ and 5 percent HCl, and dried over magnesium sulfate. Removal of the solvent in vacuo gave 550 mg. (99%) of 3-methoxy-17-methyl-16,17-seco-D-homo-estra-1,3,5-(10)-trien-16,17-dione as a light brown oil.

EXAMPLE 11

A solution of crude keto-aldehyde from Example 10 (550 mg., 1.68 mM) in 20 ml. of freshly distilled tetrahydrofuran was heated at 75° for 40 hours with an equal volume of 5 percent aqueous HCl. The solution was poured into brine and extracted with chloroform. Drying over magnesium sulfate and evaporation in vacuo gave 520 mg. of crude 3-methoxy-19-nor-pregna-1,3,5(10), 16-tetraene. The crude product was dissolved in a small amount of methanol and cooled to promote crystallization. In this this manner 317 mg. (60.5 percent) of pure product, m.p. 159°–161° was obtained.

This material was converted to d,l-estrone methyl ether, m.p. 140°–143° by the reported Beckmann rearrangement (Rosenkranz et al., J. Org. Chem. 21, 520 (1956)) and also was demethylated to give d,l-estrone, m.p. 249°–253° by known procedures.

EXAMPLE 12

To a solution of 2,6-dimethyl-1,4-benzoquinone (1.065 g, 7.82 mM) in 25 ml. of toluene at −10° was added aluminum chloride (1.334 g, 10 mM). The solution was stirred at −10° and 9,10-trans-9 β-methyl-1-vinyl-3,4,5,6,7,8,9,10-octahydro-naphthalene-6-one (1.490 g. 7.82 mM) dissolved in 20 ml. of toluene was added dropwise over a period of 10 minutes. The mixture was stirred at −10° for 2 hours and then diluted with water and extracted with benzene. Drying over magnesium sulfate and removal of the solvent at reduced pressure gave 2.6 g. of reddish adduct which solidified on standing.

Chromatography on 140 g. of $SiO_2$ using 3 percent ether in benzene as eluent gave 1.359 g. (53 percent) of 5α, 14β-17-methyl-D-homo-androst-9(11), 16-dien-3,15,17a-trione, m.p. 187°–189°.

In addition 677 mg. (27 percent) of 5α,8α,13α-17-methyl-D-homo-androst-9(11), 16-dien-3,15,17a-trione, m.p. 158°–159.5° was obtained as well as 268 mg. (10.5 percent) of a mixture of the two above compounds (approximately 1:1).

The starting material may be prepared as follows:

In a 1-liter 3-necked bottom flask fitted with a mechanical stirrer and immersed in an acetone-dry ice bath was introduced 200 ml. of liquid ammonia. Lithium metal (768 mg., 0.106 M) was added and the mixture was stirred for 40 minutes. Dry acetylene was then bubbled through the solution for 1 hour, decolorization occurring after 30 minutes. Acetylene was allowed to pass over the solution during the remainder of the reaction.

A solution of 9β-methyl-1,2,3,4,6,7,8,9-octahydronaphthalen-1,6-dione (9.31 g., 0.0475 M) in 150 ml. of absolute ether was added dropwise over 30 minutes to the stirred solution and then stirring was continued at −70° for an additional 1 hour. To this mixture was added slowly with stirring 160 ml. of aqueous saturated ammonium chloride solution. The ammonia was distilled off and the product was extracted with chloroform. The chloroform extracts were combined, washed with 5 percent hydrochloric acid, brine, and dried over magnesium sulfate. Removal of the solvent in vacuo gave 8.57 g. (81 percent) of crystalline 1-ethynyl-1β-hydroxy-9β-methyl-1,2,3,4,6,7,8,9-octahydronaphthalen-6-one. Recrystallization from ethyl acetate gave 6.22 g. (58 percent) of white crystalline product, m.p. 172°–173°.

To a solution of 4.45 g. (0.0218 M) of the above ketol in 50 ml. of dry pyridine was added 0.5 g. of 5 percent palladium on barium sulfate. The mixture was hydrogenated at 1 atm. until 1 equivalent of hydrogen had been taken up. The catalyst was filtered and washed with ether. Most of the pyridine was removed by evaporation at reduced pressure. The residue was dissolved in chloroform, washed with 5 percent hydrochloric acid, brine, and dried over magnesium sulfate. Removal of the solvent in vacuo gave a guantitative yield of oily 1β-hydroxy-9β-methyl-1-vinyl-1,2,3,4,6,7,8,9-octahydronaphthalen-6-one.

Lithium metal (0.210 g., 0.028 M) was added to 100 ml. of dry liquid ammonia at −70° and the blue solution was stirred in a 300 ml. 3-necked round bottom flask for 1 hour. Then the above vinyl ketol (1.19 g., 5.75 mM) dissolved in 25 ml. of dry tetrahydrofuran was added dropwise over 30 minutes. The mixture was allowed to stir for 2 hours and a crystal of ferric nitrate was added to promote destruction of excess lithium. After decolorization 40 ml. of 10 percent aqueous ammonium chloride solution was added while the reaction mixture was still at −70°. The ammonia was distilled off and the product was extracted with chloroform. The combined chloroform extracts were washed with 5 percent hydrochloric acid, brine, and dried over magnesium sulfate. Removal of solvent in vacuo produced an oil which was dissolved in etherhexane to promote crystallization of 0.82 g. (68 percent) of 1β-hydroxy-9β-methyl-1-vinyl-perhydronaphthalen-6-one, m.p. 95°–95.5°.

Crystalline vinyl ketol from above (2.00 g., 9.62 mM), freshly fused potassium bisulfate (1.05 g., 7.72 mM) and 52 mg. of pyrogallol were crushed, mixed thoroughly and placed in a 50 ml. round bottom flask fitted with a vacuum adaptor. The mixture was heated at 60 mm. Hg and 145° for 20 minutes and then cooled to room temperature. The procedure was repeated using 2.57 g. (12.35 mM) of vinyl ketol. The organic material in the two flasks was dissolved in a small quantity of benzene and placed directly on a column of neutral alumina (200 g., activity II). Elution with benzene gave 1,77 g. of semi-crystalline 9,10-trans-9β-methyl-1-vinyl-3,4,5,6,7,8,9,10-octahydronaphthalene-6-one. Further elution with a 4 percent ether-benzene mixture yielded 0.53 g. of crystalline starting material.

EXAMPLE 13

To a mixture of 14β-17-methyl-D-homo-androst-9'(11), 16-dien-3,15,17a-trione (380 mg., 1.17 mM) in 20 ml. of absolute methanol was added 80 mg. (0.95 mM) of sodium bicarbonate and the mixture was stirred at reflux for 2 hours. The solution was diluted with water and extracted with chloroform. The combined extracts were washed with brine and dried over magnesium sulfate. The solvent was removed in vacuo to give a solid which was filtered and washed with ether hexane to give 346 mg. (91 percent) of 5α-17-methyl-D-homo-androst-9(11),16-dien-3,15-17a-trione of m.p. 197°–198°.

EXAMPLE 14

Crystalline 5α-17-methyl-D-homo-androst-9(11), 16-dien-3,15,17a-trione (850 mg., 2.6 mM) was dissolved in 80 ml. of dry benzene; 3 ml. ethylene glycol and 33 mg. of p-toluenesulfonic acid were added and the reaction mixture was refluxed with a water separator for 1 hour. The mixture was allowed to cool and then poured into an aqueous saturated sodium bicarbonate solution. The benzene layer was separated and the aqueous layer was further extracted with benzene. The combined extracts were dired over sodium sulfate. Removal of the solvent at reduced pressure and crystallization of the crude product from ether gave 918 mg. (95 percent) of 5α-3,3-ethylenedioxy-17-methyl-D-homo-androst-9(11),16-dien-15,17a-dione, m.p. 168.5°–170°.

EXAMPLE 15

A solution of 918 mg. (2.48 mM) of 5 α-3,3-ethylenedioxy-17-methyl-D-homo-androst-9(11),16-dien-15,17a-dione and 822 mg. (3.24 mM) of lithium aluminum tri-tert-butoxy-hydride in 50 ml. of dry tetrahydrofuran was stirred at room temperature for 30 minutes. The solution was diluted with water, extracted with chloroform and the combined extracts were dried over sodium sulfate. Removal of solvent in vacuo gave crude oily 5α-3,3-ethylenedioxy-17a-hydroxy-17-methyl-D-homo-androst-9(11),16-dien-15-one which was used without purification in the next reaction.

EXAMPLE 16

A solution of crude 5α-3,3-ethylenedioxy-17a-hydroxy-17-methyl-D-homo-androst-9(11),16-dien-15-one from above and 3 ml. of mesyl chloride in 30 ml. of dry pyridine was kept at room temperature for 20 hours. The solution was diluted with ether and poured into half-saturated aqueous sodium chloride solution. The ether layer was separated, the aqueous phase was further extracted with ether and the combined extracts were dried over sodium sulfate. Removal of the solvent at reduced pressure gave crude oily 5α-3,3-ethylenedioxy-17a-methylsulfonyloxy-17-methyl-D-homo-androst-9(11),16-dien-15-one which was used without purification in the next reaction.

EXAMPLE 17

The crude mesylate from above was refluxed in 40 ml. of benzene-methanol (1:1) for 24 hours in the presence of freshly activated zinc dust. Fresh portions of zinc dust were added every few hours so that a total of about 4 g. was used. The solid material was filtered and washed with 5 ml. of benzene-methanol (1:1). To the filtrate was added 600 mg. of potassium carbonate and the mixture was refluxed at 70° for 18 hours, cooled, diluted with water and extracted with benzene. The combined extracts were washed with 2 percent aqueous hydrochloric acid, saturated aqueous sodium bicarbonate solution, brine and dried over magnesium sulfate. Removal of the solvent in vacuo and crystallization of the crude product from ether-hexane gave 774 mg. (88 percent from crystalline diketo-diene of Example 14) of 5α-3,3-ethylenedioxy-17-methyl-D-homo-androst-9(11),16-dien-15-one, m.p. 150°–152°.

EXAMPLE 18

To a solution of the keto-diene from Example 17 (774 mg., 2.17 mM) in 20 ml. of dry ether at room temperature was added dropwise 0.60 ml. (4.0 mM) of sodium bis(2-methoxyethoxy) aluminum hydride as a 70 percent benzene solution. The reaction was complete in 20 minutes and 2 percent aqueous sodium hydroxide solution was added to destroy the excess hydride. The mixture was poured into half-saturated aqueous sodium chloride solution and extracted with ether. The combined ether extracts were dried over magnesium sulfate and the solvent was removed at reduced pressure (25°) to give crude oily 5α-3,3-ethylenedioxy-17-methyl-D-homo-androst-9(11),16-dien-15-ol which was used without purification in the next reaction.

EXAMPLE 19

Crude alcohol from Example 18 was dissolved in 15 ml. of dry pyridine and 15 ml. of freshly distilled acetic anhydride. The solution was stirred at room temperature for 90 hours and then diluted with ether and water and neutralized with solid sodium bicarbonate. The product was extracted with ether and the combined ether extracts were washed with 5 percent hydrochloric acid, brine, and dried over magnesium sulfate. Removal of solvent in vacuo (25°) gave crude 5α-15-acetoxy-3,3-ethylene-dioxy-17-methyl-D-homo-androst-9(11),16-diene as an oil which was used directly in the next reaction.

EXAMPLE 20

Crude allylic acetate from Example 19 was dissolved in 60 ml. of dry tetrahydrofuran and added to 200 ml. of liquid ammonia. The solution was allowed to reflux and 140 mg. (20.0 mM) of lithium metal was added. The solution turned blue, the color persisting throughout the reaction. After 30 minutes, small portions of solid ammonium chloride were added to the mixture to discharge the color and the ammonia was then allowed to evaporate. The mixture was diluted with water and extracted with ether. Combined ether extracts were washed with brine and dried over magnesium sulfate. Evaporation of the solvent in vacuo followed by crystallization of the crude product from ether-hexane gave 627 mg. (84 percent from crystalline ketodiene of Example 17) of 5α-3,3-ethylenedioxy-17-methyl-D-homo-androst-9(11),16-diene, m.p. 145°–147°.

EXAMPLE 21

To a solution of 5α-3,3-ethylenedioxy-17-methyl-D-homo-androst-9(11),16-diene (415 mg., 1.21 mM) in 15 ml. of dry pyridine was added 338 mg. (1.33 mM) of osmium tetroxide. The reaction mixture was stirred at room temperature for 1 hour and aqueous sodium bisulfite solution (760 mg., 7.31 mM; in 30 ml. water) was added to destroy the osmate ester. The mixture was stirred at room temperature for 1.5 hours and the resulting orange solution was thoroughly extracted with chloroform. The combined extracts were washed with 5 percent hydrochloric acid solution and aqueous saturated sodium bicarbonate solution and dried over magnesium sulfate. Removal of the solvent at reduced pressure gave a crude mixture (two spots on t.l.c.) of oily diols.

The crude diol mixture was dissolved in 15 ml. of dry tetrahydrofuran and cooled to 0°. Recrystallized lead tetraacetate (645 mg., 1.46 mm) was added and the reaction mixture was stirred at 0° for 15 minutes, then diluted with water and extracted with chloroform. The combined extracts were washed with aqueous saturated sodium bicarbonate solution, brine, and dried over magnesium sulfate. Removal of solvent in vacuo (less then 50°) followed by crystallization of the crude product from ether-hexane gave 355 mg. (79 percent) of 5α-3,3-ethylenedioxy-17-methyl-16,17-seco-D-homo-androst-9(11)-en-16,17-dione, m.p. 133°–136°.

EXAMPLE 22

A solution of keto-aldehyde from Example 21 (338 mg., 0.904 mM) in 30 ml. of tetrahydrofuran-aqueous 5 percent hydrochloric acid (1:1) was stirred under nitrogen at reflux (70°) for 28 hours. The mixture was cooled, diluted with chloroform, partitioned and the aqueous layer further extracted with chloroform. The combined extracts were washed with aqueous saturated sodium bicarbonate solution, brine, and dried over magnesium sulfate. Removal of the solvent in vacuo followed by crystallization from ether gave 152 mg. (52 percent) of 5α-pregna-9(11),16-dien-3,20-dione, m.p. 195°–198°.

EXAMPLE 23

To a solution of 5α-pregna-9(11),16-dien-3,20-dione (45 mg., 0.144 mM) in 3.5 ml. ethyl acetate and 1 ml. glacial acetic acid was added 40 mg. of 10 percent palladium on charcoal catalyst, and the mixture was hydrogenated at 1 atmosphere and room temperature for 4 hours. The catalyst was filtered off and the filtrate was diluted with water and neutralized with solid sodium bicarbonate. After extraction with chloroform, drying of the extracts over magnesium sulfate and removal of the solvent at reduced pressure 42 mg. of crude material was obtained. Preparative thin-layer chromatography was carried out, eluting with benzene-ether (1:1), and 15 mg. (33 percent) of crystalline 5α-pregnane-3,20-dione was obtained, m.p. 207°–209°. This material was found to be identical with an authentic sample by n.m.r. t.l.c., solution i.r. and mass spectrum.

I claim:

1. A process for preparing a compound of the formula

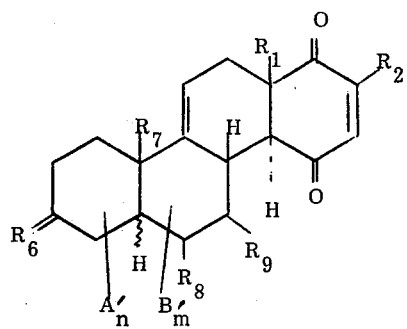

XVIII or

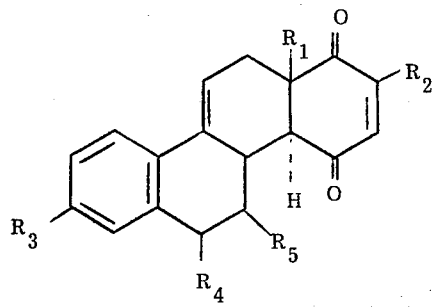

VI wherein $R_1$ and $R_2$ both independently are $C_1$–$C_4$ lower alkyl; $R_3$ is hydrogen, $C_1$–$C_7$ lower alkoxy, $C_7$–$C_{12}$ aryl lower alkoxy or $C_1$–$C_{12}$ acyloxy; $R_4$, $R_5$, $R_8$ and $R_9$ are independently selected from the group consisting of hydrogen or $C_1$–$C_7$ lower alkyl; $R_6$ is oxo, $C_1$–$C_5$ lower alkylenedioxy, wherein the oxygen atoms are on adjacent carbon atoms arylenedioxy, selected from the group consisting of phenylenedioxy, 4,5-dimethyl phenylene, 1,2-naphthalenedioxy and 2,3-naphthalenedioxy H,H, or H,$R_{10}$ where $R_{10}$ is $C_1$–$C_7$ lower alkoxy, $C_7$–$C_{12}$ aryl lower alkoxy or $C_1$–$C_{12}$ acyloxy; $R_7$ is $C_1$–$C_4$ lower alkyl or $C_2$–$C_4$ lower alkylene; A' is an additional carbon-carbon bond between positions 4 and 5; B' is an additional carbon-carbon bond between positions 5 and 6; m and n are 0 or 1 with the proviso that if either is 1, then the other is 0; wherein said acyloxy moiety as used above in all occurrences is derived from alkanoic, benzoic or benzoic mono-substituted by lower alkyl, nitro or halo acids said process comprising the step of epimerizing the corresponding 13,14-cis compounds by treatment with an alkali bicarbonate.

2. The process of claim 1 wherein said process is carried out in refluxing lower alkanol.

3. The process of claim 2 wherein said alkali bicarbonate is sodium bicarbonate and said lower alkanol is methanol.

4. The process of claim 1 wherein 14β-3-methoxy-17-methyl-D-homo-estra-1,3,5(10),9(11),16-pentaen-15,17a-dione is epimerized to 13,14-trans-3-methoxy-17-methyl-D-homo-estra-1,3,5(10),9(11),16-pentaen-15,17a-dione.

5. The process of claim 1 wherein 14β-17-methyl-D-homo-androst--(-methyl-D-homo-androst-(,11),16a-trione  a-trione epimerized to to 5α-17-methyl-D-homo-androst-9),),163,15,17a-trione.

* * * * *

UNITED STATES PATENT AND TRADEMARK OFFICE
CERTIFICATE OF CORRECTION

PATENT NO. : 3,876,705
DATED : April 8, 1975
INVENTOR(S) : Zdenek Valenta

It is certified that error appears in the above-identified patent and that said Letters Patent are hereby corrected as shown below:

Col. 22, line 9, "4,5-dimethyl phenylene"
    should be: 4,5-dimethyl phenylenedioxy Col. 22, line 39, "9),), 163," should be: 9(11),16-dien-3,

Signed and Sealed this
fifteenth Day of June 1976

[SEAL]

Attest:

RUTH C. MASON
*Attesting Officer*

C. MARSHALL DANN
*Commissioner of Patents and Trademarks*